(12) United States Patent
Sargent

(10) Patent No.: US 6,502,793 B1
(45) Date of Patent: Jan. 7, 2003

(54) MUSICAL INSTRUMENT ACCESSORY MOUNTING DEVICE

(75) Inventor: James M. Sargent, Conneaut, OH (US)

(73) Assignee: CTI Audio, Inc., Conneaut, OH (US)

( * ) Notice: Subject to any disclaimer, the term of this patent is extended or adjusted under 35 U.S.C. 154(b) by 0 days.

(21) Appl. No.: 09/894,953

(22) Filed: Jun. 28, 2001

(51) Int. Cl.[7] .............................................. F16M 11/00
(52) U.S. Cl. ...................................... 248/176.1; 84/421
(58) Field of Search ............................... 248/205.1, 200, 248/176.1; 84/421; 984/257, DIG. 1

(56) References Cited

U.S. PATENT DOCUMENTS

| | | | | |
|---|---|---|---|---|
| 4,466,596 A | * | 8/1984 | Cohen | 248/635 |
| D305,026 S | * | 12/1989 | Wolf | D14/12 |
| 4,939,972 A | * | 7/1990 | Falberg | 84/422.4 |
| 5,684,258 A | * | 11/1997 | Liao | 84/421 |
| 5,703,306 A | * | 12/1997 | Liao | 84/421 |

* cited by examiner

Primary Examiner—Ramon O. Ramirez
(74) Attorney, Agent, or Firm—Sand & Sebolt

(57) ABSTRACT

The mounting device releasably mounts an accessory, such as a microphone, to a lug of a musical instrument such as a drum. The device includes a base, a lug-engaging connector mounted on the base and an accessory support mounted on the base. The accessory releasably attaches to the accessory support.

26 Claims, 6 Drawing Sheets

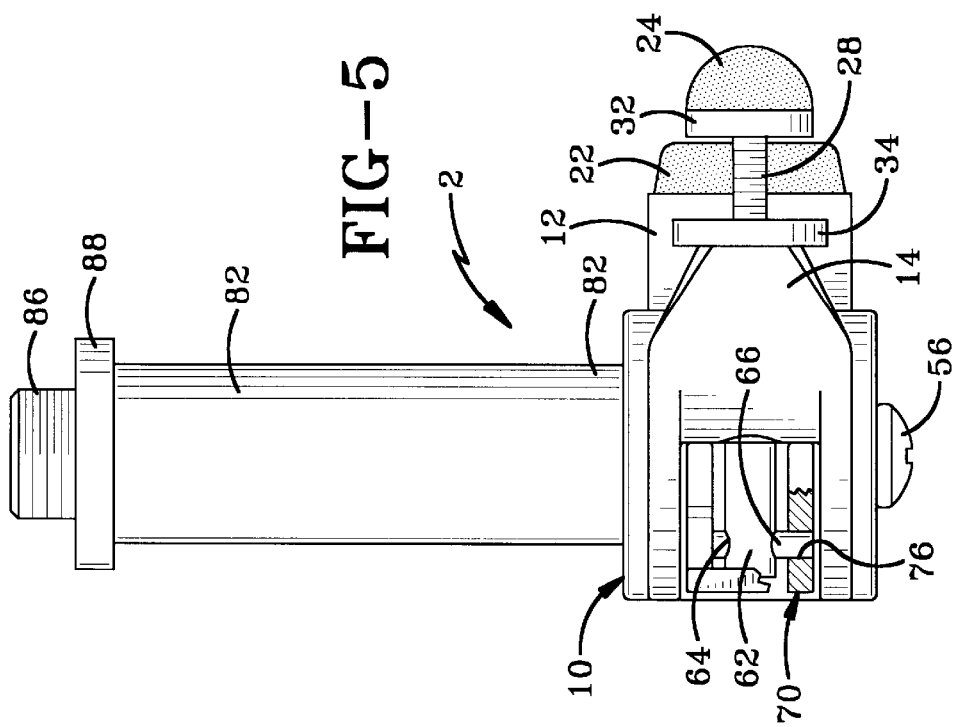
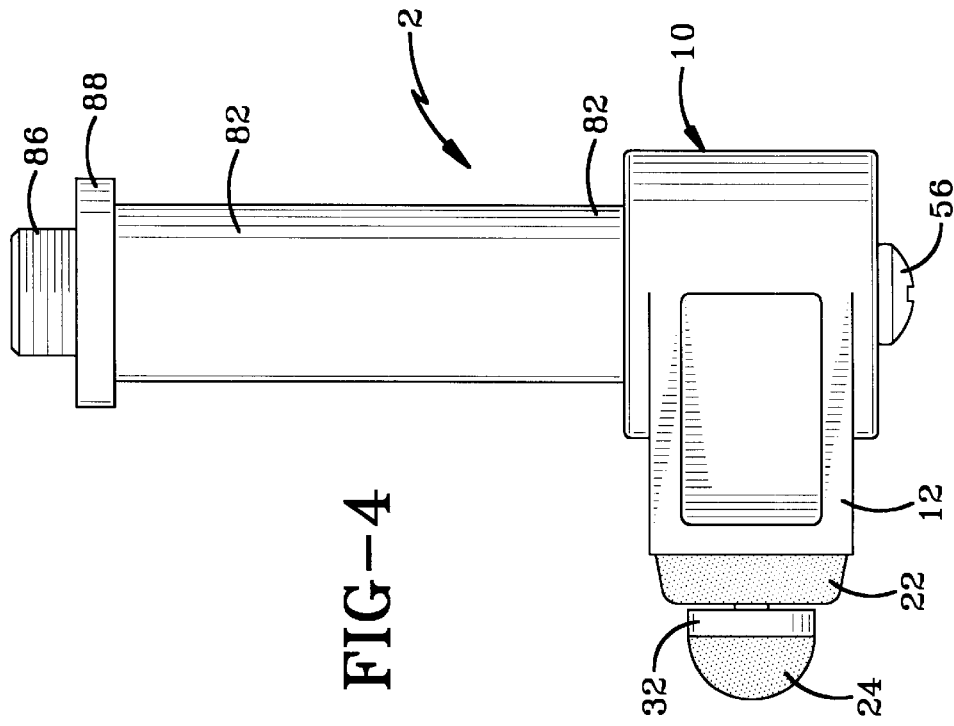

MUSICAL INSTRUMENT ACCESSORY MOUNTING DEVICE

BACKGROUND OF THE INVENTION

1. Technical Field

The invention relates generally to mounting devices, and more particularly to mounting devices used for attaching a microphone or other accessory onto a musical instrument. More specifically, the invention relates to a mounting device that is adapted to engage the lugs on the side of a drum.

2. Description of Related Art

When bands perform, amplifying the sound of both the singer's voice and the musical instruments may be desirable so that the music and the singer may be clearly heard by the audience. In order for the sound of an instrument to be heard, a microphone may be positioned in close proximity to the instrument to clearly pick up the sound. At other times, the musician may wish to use other musical accessories such as bells, small music stands or the like. Free standing stands may be used, but the stands are easily knocked over if they get in the way of the performers.

A number of devices have been suggested in the prior art for mounting accessories, such as microphones and other small instruments, directly onto musical instruments and more specifically onto drums. Examples of this prior art include U.S. patents granted to Cohen (4,466,596) and Wolf (Des. 305,026).

These devices have utilized clamping type jaws for grasping the rims of drums. While these devices have worked, they are somewhat time consuming to apply, requiring a fair amount of adjustment both during attachment and removal, and can potentially damage the rim of the drum if the user is not paying sufficient attention.

SUMMARY OF THE INVENTION

The device of the present invention is an accessory mounting device that is adapted to be attached to a musical instrument, such as a drum. The device includes a base, a connector mounted on the base and an accessory support mounted on the base. When the device is mounted on a drum for example, the base engages the side of the drum and the connector engages a drum lug. The accessory, such as a microphone, is-attached to the support.

BRIEF DESCRIPTION OF THE DRAWINGS

The preferred embodiments of the invention, illustrative of the best modes in which applicant has contemplated applying the principles of the invention, are set forth in the following description and are shown in the drawings and are particularly and distinctly pointed out and set forth in the appended claims.

FIG. 4 is a left-hand side view of the device shown in FIG. 1;

FIG. 5 is a right-hand side view of the device shown in FIG. 1;

Similar numerals refer to similar parts throughout the specification.

DETAILED DESCRIPTION OF THE INVENTION

The following description outlines how the mounting device of the present invention may be used in association with a drum. The mounting device may however be used to attach an accessory to other musical instruments.

Figure 1:
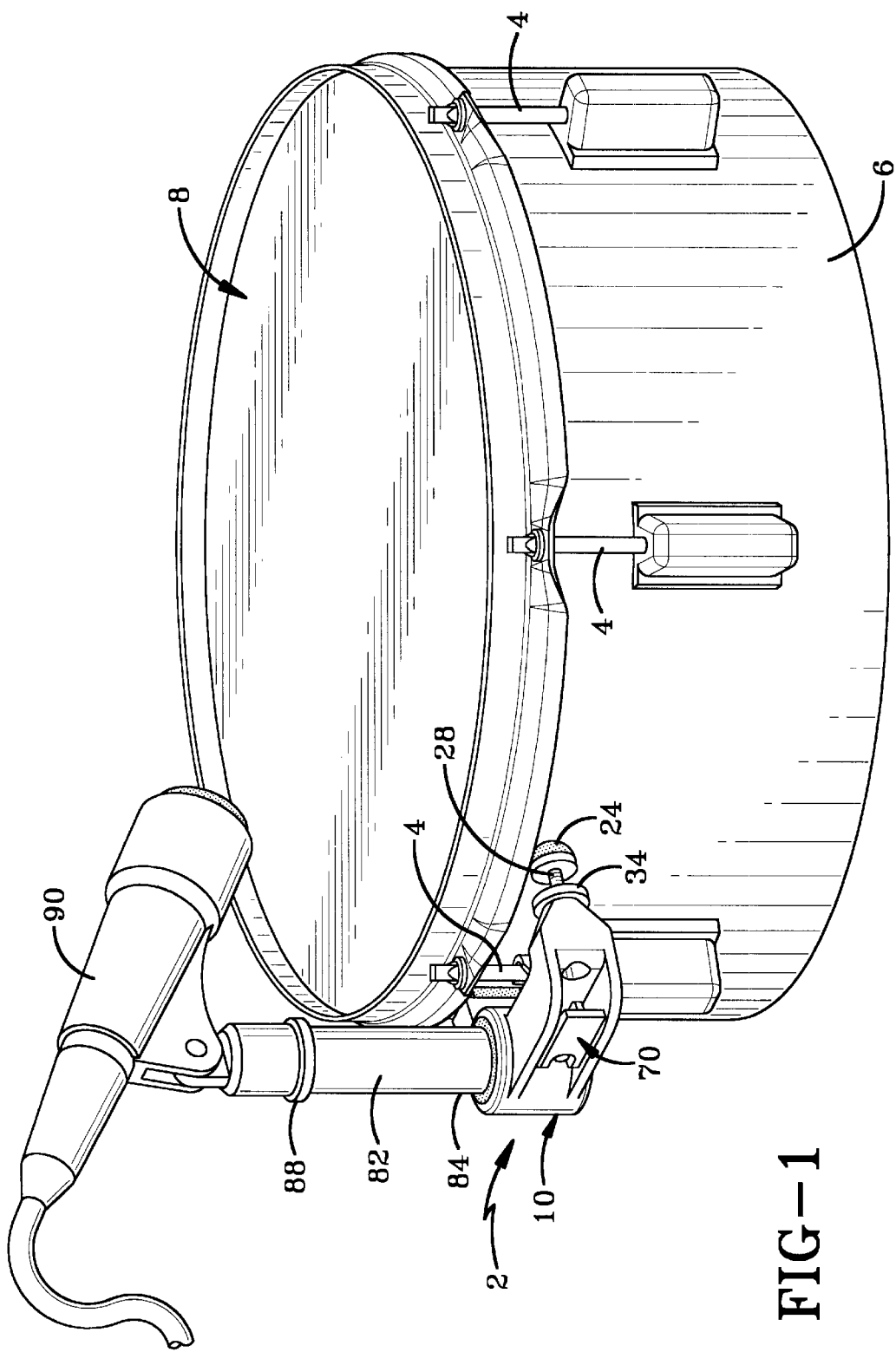
FIG. 1 is a perspective view of the accessory mounting device shown mounted onto a drum.
Figure 2:
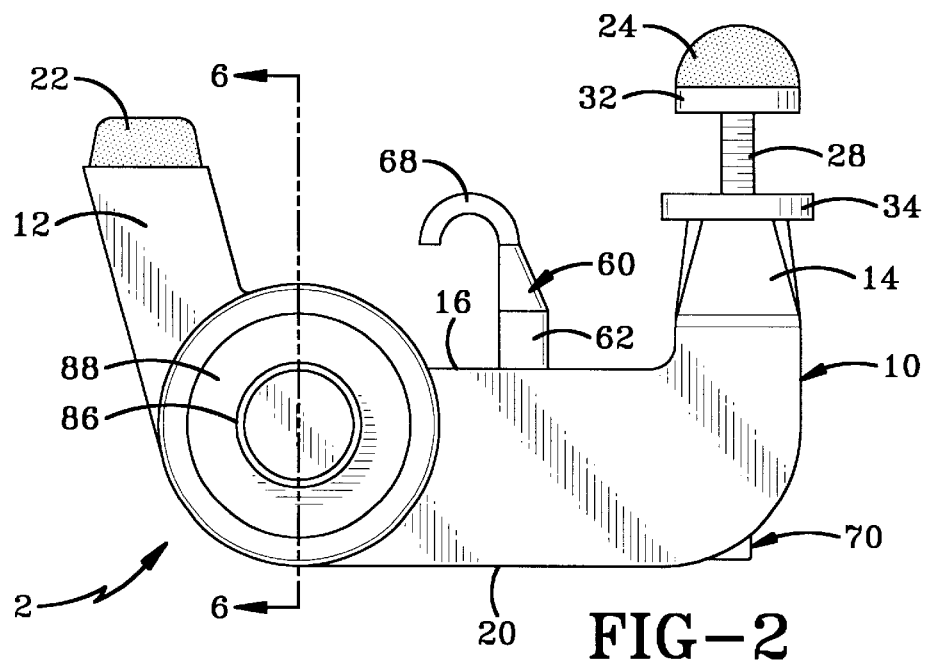
FIG. 2 is a plan view of the accessory mounting device.
Figure 3:
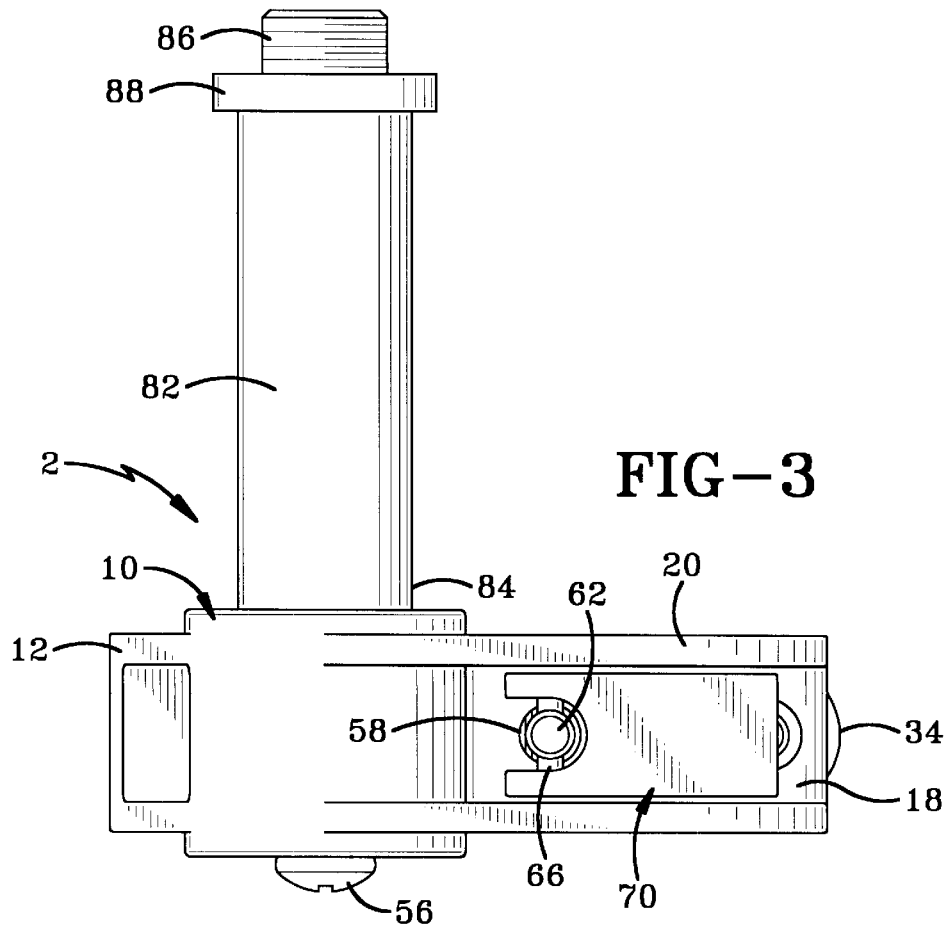
FIG. 3 is a front view of the device when it is mounted on a drum.
Figure 6:
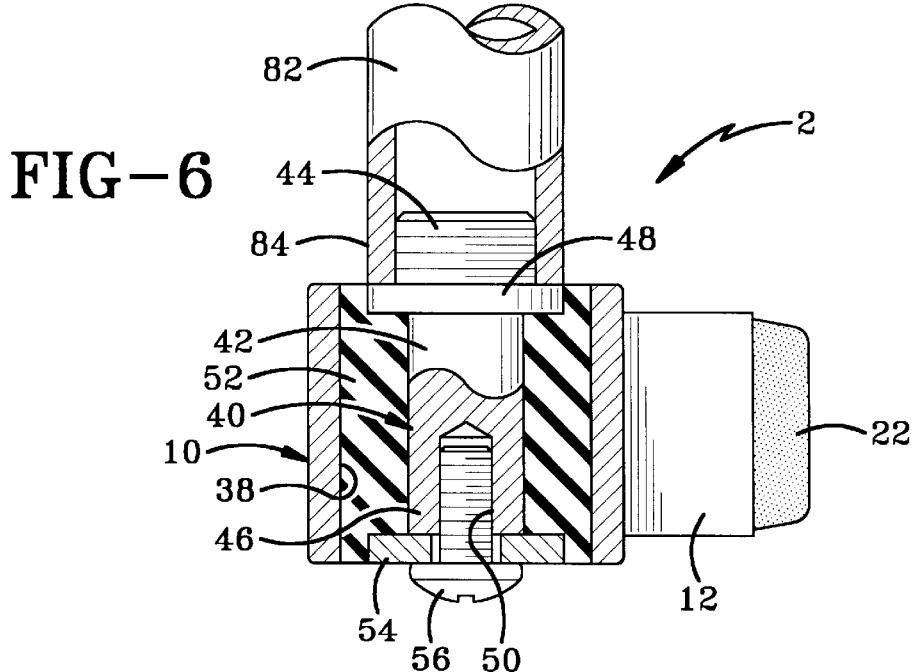
FIG. 6 is a cross-sectional view through line 6—6 of FIG. 2.

Referring to FIG. 1, the accessory mounting device of the present invention, shown generally at 2, is adapted to engage a drum lug 4 mounted on the side 6 of a drum 8.

Mounting device 2 includes a base 10 which may be manufactured from metal, plastic, wood or any other suitable material. Base 10 defines an inner surface 16 and an outer surface 20. First and second legs 12, 14 extend from opposite ends of base 10. First and second legs may be formed as an integral part of base 10 or may be mounted on base 10 by a suitable means. Alternatively, one of the first and second legs 12, 14 may be formed as an integral part of base 10, while the other of the first and second legs 12, 14 may be mounted on base 10. Base 10 defines a channel 18 in outer surface 20 of base 10. Channel 18 may be shaped, being essentially flat (19) proximate second leg 14 and convexly curved (21) proximate first leg 12.

First and second feet 22, 24 extend from the ends of first and second legs 12, 14. Feet 22, 24 may be manufactured from any resilient material such as rubber. First foot 22 may be glued onto the end of first leg 22 or may be received within a recess (FIG. 7) at the end of first leg 22. First foot 22 may also be attached with a suitable connector such as a screw, a nail etc.

Second leg 14 defines a longitudinal bore 26 through which a threaded or partially threaded shaft 28 is inserted. Shaft 28 has stopper 30 at one end and second foot 24 at the other end. Shaft 28 may be loosely received within longitudinal bore 26. Stopper 30 prevents shaft 28 from being completely withdrawn from bore 26. Second foot 24 is mounted on nut 32 so that foot 24 has a firm base. Second foot 24 is preferably a resilient pad which is shaped so as to enable it to more fully engage curved side 6 of drum 8. A knurled adjuster nut 34 is disposed between nut 32 and inner end 36 of second leg 14. When adjuster nut 34 abuts inner end 36 of second leg 14, rotation of adjuster nut 34 causes second foot 24 to be moved toward or away from upper end 36. Adjuster nut 34 engages threads 35 on shaft 28. Shaft 28, nut 32 and adjuster nut 34 are preferably made from a suitable metal.

Base 10 further includes an accessory holder 37 for receiving and holding an accessory 90. Base 10 defines an aperture 38 that receives a portion of holder 37. A shock pin 40 inserted in aperture 38. Aperture 38 is disposed in an area of base 10 adjacent first leg 12. Shock pin 40 includes a shaft 42 having a first end 44, a second end 46 and an area of greater diameter 48 proximate its middle. First end 44 of shaft 42 is externally threaded and second end 46 includes pin bore 50. Shaft 42 is surrounded by a resilient shock absorber 52. Pin 40 and absorber 52 are secured together at first end 46 of shaft 44 with a washer 54 and a connector 56 that prevents shaft 42 from moving upwardly with respect to connector 56. Pin 40 and absorber 52 are frictionally held within aperture 38.

A mount tube 82, being internally threaded on one end 84 and externally threaded on the other end 86, may be screwed onto end 44 of shock pin 40. An internally threaded jam nut 88 is used to secure accessory 90 (such as a microphone) onto tube 82.

Shock pin 40 and mount tube 82 are shown as two separate components, but may be formed as a single unit without departing from the scope of this invention. Both shock pin 40 and mount tube 82 may be made from metal, plastic, wood or other suitable material.

A slot 58 is provided in the inner surface 16 of base 10, intermediate first and second legs 12, 14. Slot 58 opens into channel 18. A portion of latching member 60 for securing device 2 to drum lug 4 is received within slot 58. Latching member 60 may be any suitable mechanism which engages and secures base 10 to lug 4. In the drawings, latching member 60 includes a shaft 62 that has a hole 64 proximate one end. Hole 64 is normal to the longitudinal axis of shaft 62 and is adapted to receive a roll pin 66 therethrough. The other end of shaft 62 includes a hook 68 which extends between first and second legs 12, 14 when shaft 62 is received within slot 58. Hook 68 may be configured with the curved end as shown in the drawings, or hook 68 may include a T-shaped end or a L-shaped end.

Latching member 60 includes a lever 70 which is at least partially disposed within channel 18. Lever 70 may be substantially "L" shaped having a first longer arm 72 and a second shorter arm 74. Lever 70 includes a hole 76 which is adapted to align with hole 64 of latching member 60. Lever 70 is secured to latching member 60 by roll pin 66 being inserted through hole 64 and hole 76. Latching member 60 is prevented from being withdrawn from slot 58 by lever 70 and hook 68. Shaft 62 of latching member 60 is loosely held within slot 58 so that hook 68 may be manipulated to engage drum lug 4. Shaft 62 may be moved within slot 58 so that hook 68 is moved away from or drawn closer to the inner surface 16. Additionally, shaft 62 can be rotated within slot 58 so that hook 58 opens either toward first leg 12 or second leg 14. This allows the user to select in which direction they wish to capture drum lug 4. Shorter arm 74 of lever 70 may engage the curved portion of channel 18 to lock lever 70 in the closed position as will be further described.

While latching member 60 has been described above as including shaft 62, hook 68 lever 70, any other suitable lug engaging latching member 60 may be used. For example, a flexible cord (not shown) may be looped around lug 4, drawn through slot 58 and secured by a clamp (not shown) that creates enough tension in the cord to hold base 10 on drum 8. The clamp may be a nut and threaded rod combination that allows the user to vary the tensile force in the cord. In another embodiment, shaft 62 may have a threaded portion that receives a nut. Rotation of the nut against body 10 would create a tensile force in shaft 62 to hold body 10 in place. Various other tension-creating devices and arrangements may be used to hold body 10 onto drum 8.

Referring to FIGS. 7 to 10, the device of the present invention is used in the following manner.

Figure 7:
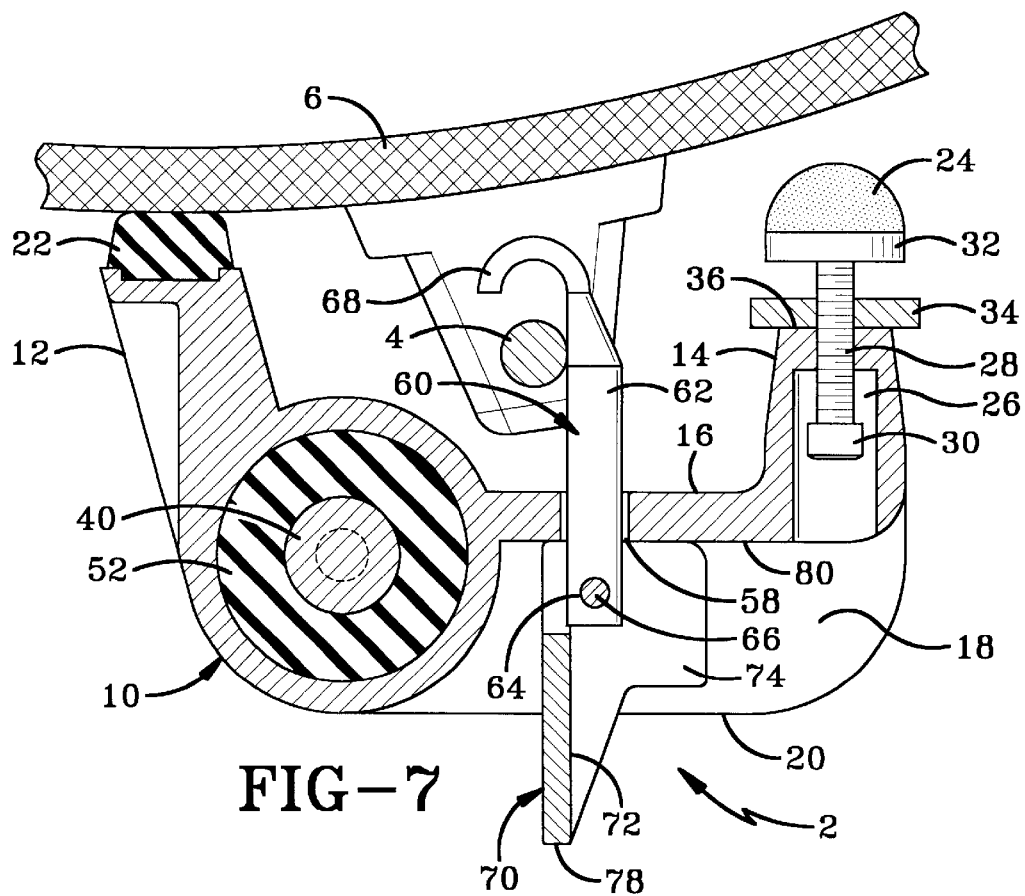
FIG. 7 is a cross-sectional plan view of the device as it is being brought into a position where it is ready to engage the drum.
Figure 8:
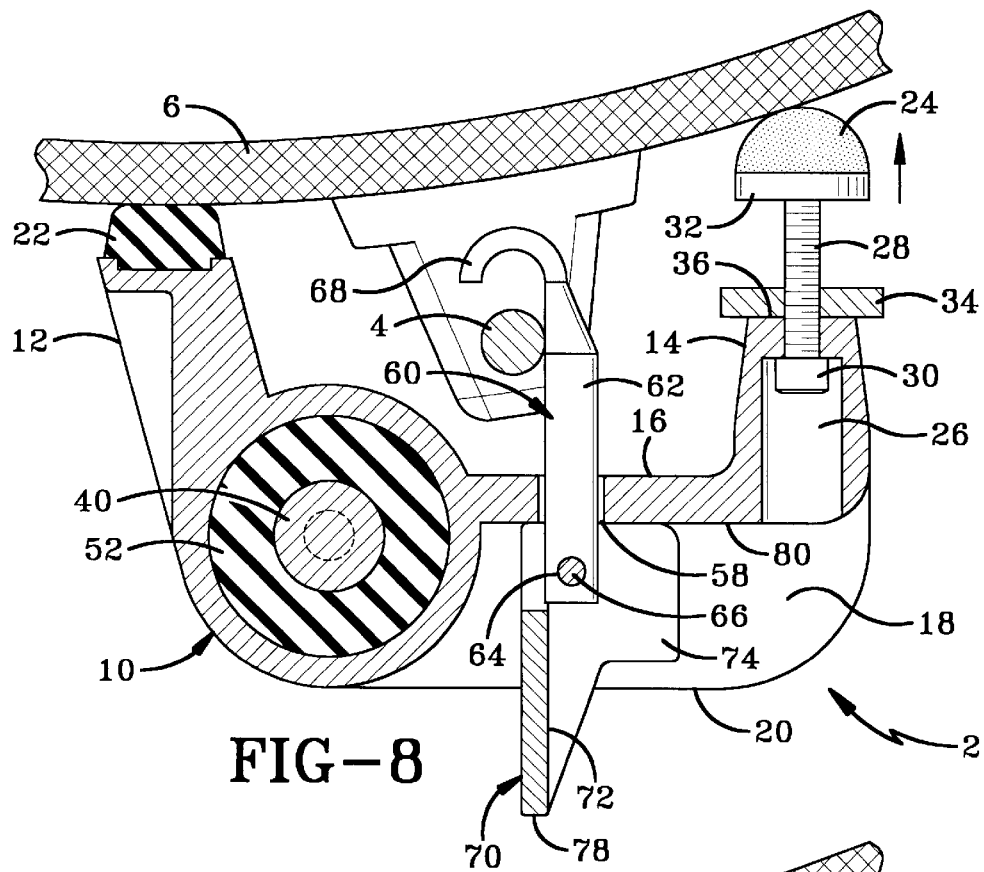
FIG. 8 is a cross-sectional plan view of the device showing the relationship of the components of the device as the-foot of the second leg is moved into engagement with the side of the drum.
Figure 9:
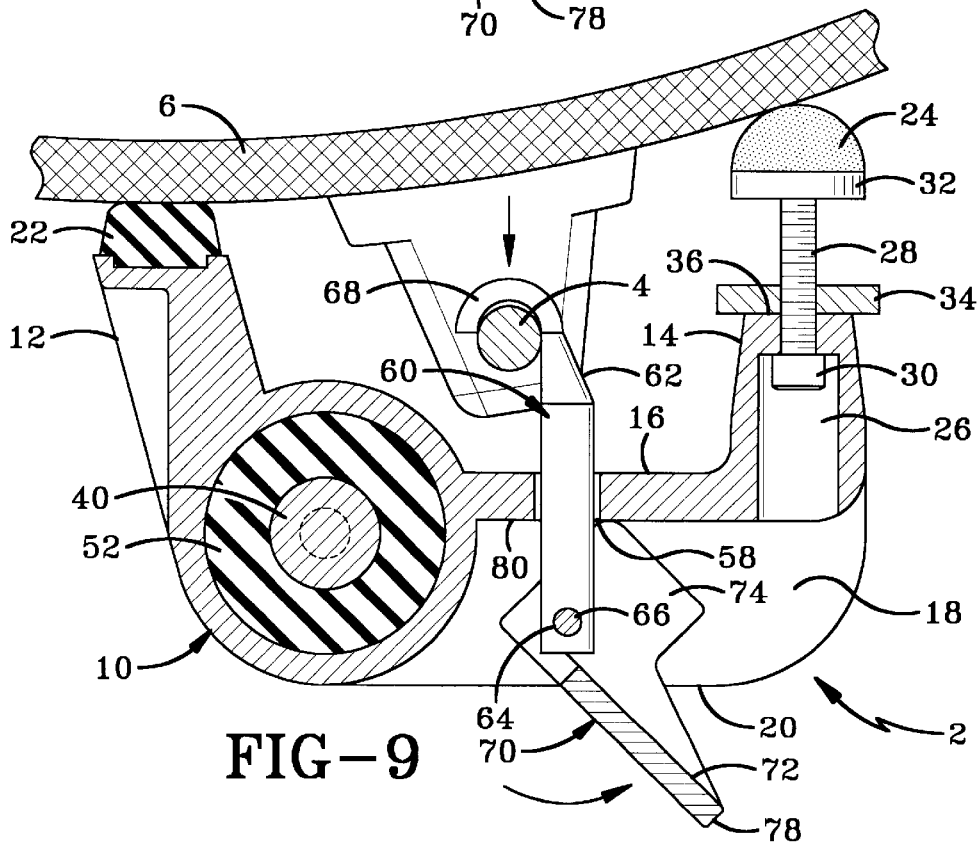
FIG. 9 is a cross-sectional plan view of the device as the hook is drawn into engagement wit drum lug.

Base 10 is brought into close proximity to side 6 of drum 8. First foot 22 is placed against side 6 and hook 68 is moved behind drum lug 4 by manipulating lever 70 (FIG. 7). The user then rotates adjuster nut 34 to move second foot 24 into contact with side 6 as shown in FIG. 8. Longer arm 72 of lever 70 is rotated toward second leg 14 in the manner shown in FIG. 9. This draws hook 68 into contact with drum lug 4. The user continues to rotate longer arm 72 until it reaches the position shown in FIG. 10 where lever 70 locks in a first position. Continued rotation of longer arm 72 until edge 78 contacts outer surface 80 of second leg 14 is possible. This movement brings shorter arm 74 into contact with the curved surface of channel 18 and also draws hook 68 further down toward the inner surface 16 of base 10. When edge 78 contacts outer surface 80, lever 70 is locked in a second position. This second position may be required in certain situations where drum lug 4 is not securely gripped when latching member 60 is in the position shown in FIG. 10. Care must be taken not to grip drum lug 4 too tightly as this may cause damage to the drum 8. Microphone 90 is then secured to mount tube 82 by screwing jam nut 88 into place to grip it. In the situation where shaft 62 is rotated so that hook 68 opens toward second leg 14, lever 70 is rotated in an opposite direction to that shown in FIGS. 7 through 10. Lever 70 is rotated by the user's finger (not shown).

Figure 10:
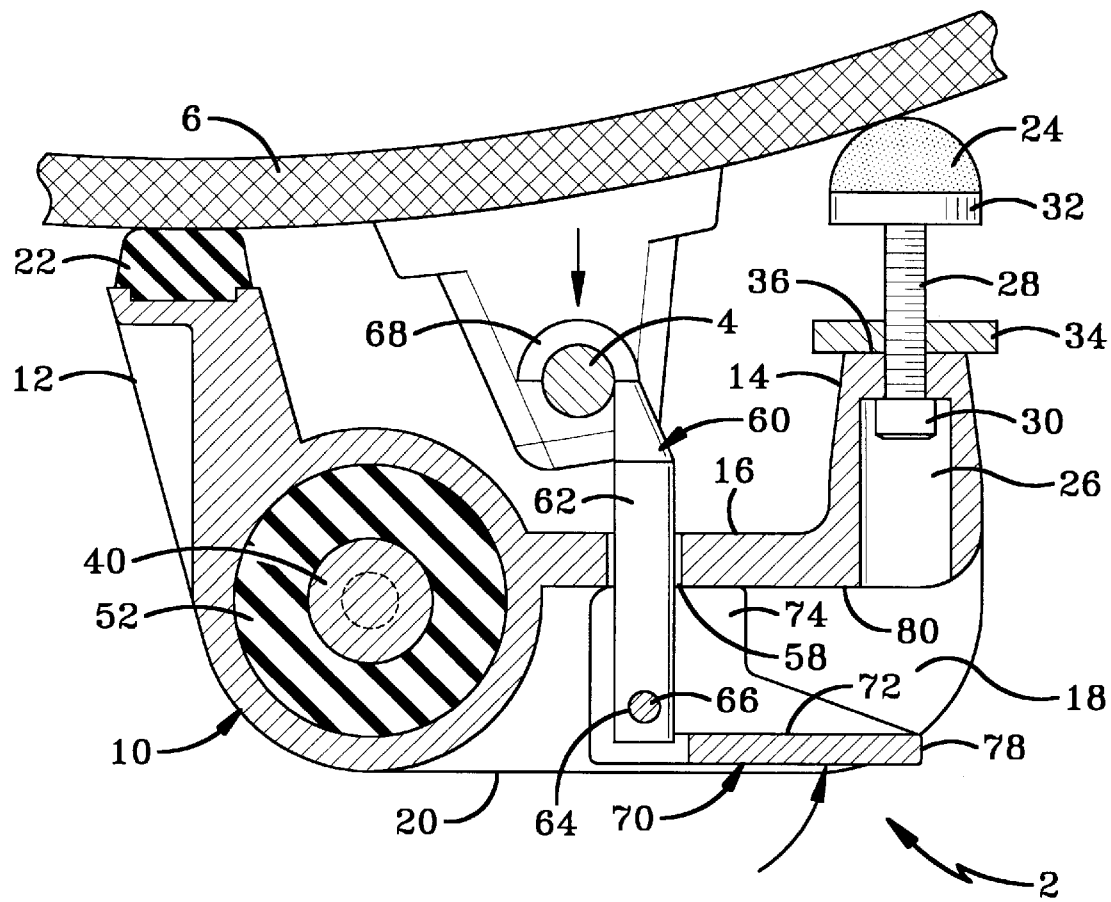
FIG. 10 is a cross-sectional plan view of the device as the hook is locked into place.

When hook 68 is fully engaged with drum lug 4 and is locked into position as shown in FIG. 10, the opposing action of second foot 24 engaging side 6 by virtue of shaft 28 being held in place by adjuster nut 34, serves to urge base 10 into engagement with side 6 of drum 8. This securely holds the device in place against side 6 of the drum 8 and provides a firm and secure footing for an accessory.

Referring to FIGS. 7 through 10, when microphone 90 is to be detached from drum 8, jam nut 88 is loosened and microphone 90 is removed. If the user so desires, microphone 90 may be left attached to mount tube 82 and mount tube 82 is simply unscrewed from shock pin 40. The user then rotates lever 70 in an opposite direction to that shown in FIGS. 10 and 9. As lever 70 rotates, hook 68 disengages from drum lug 4. The user then moves second leg 14 off side 6 in such a manner that hook 68 clears drum lug 4. First leg 12 is then pulled away from side 6 and the device may be stored for future use.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. A support for attaching an accessory to a musical instrument, the instrument having a side and at least one lug, the support comprising:

a base, the base having first and second legs extending from opposite ends of the base, the first and second legs being adapted to contact the side of the musical instrument;

a connector attached to the base, the connector adapted to engage the lug and hold the base on the instrument; and an accessory holder mounted on the base.

2. A support as defined in claim 1, wherein the connector includes means for forcing the base toward the instrument.

3. A support as defined in claim 1, wherein the first and second legs are integrally formed with the base.

4. A support as defined in claim 1, wherein the first and second legs are mounted on the base.

5. A support as defined in claim 1, wherein one of the first and second legs is integrally formed with the base and the other of the first and second legs is mounted on the base.

6. A support as defined in claim 1, wherein the first leg has a first free end which adapted to contact the side of the musical instrument, and a first resilient member is mounted on the first free end.

7. A support as defined in claim 1, wherein the second leg has a second free end adapted to contact the side of the musical instrument, and a second resilient member is mounted on the second free end.

8. A support as defined in claim 7, wherein the second leg defines a bore; and the second resilient member comprises:
   a shaft receivable within the bore;
   a pad mounted on one end of the shaft; and
   a stopper mounted on the other end of the shaft, said stopper preventing withdrawal of the shaft from the bore.

9. A support as defined in claim 8, wherein the shaft is threaded and the second resilient member further comprises:
   an adjuster nut mounted on the shaft between the pad and the free end of the second leg, the adjuster nut being rotatable so as to adjust the position of the pad relative to the free end of the second leg.

10. A support as defined in claim 8, wherein the pad is shaped to maximize engagement with the side of the drum.

11. A support as defined in claim 1, wherein the connector includes means for creating a tensile force in the connector.

12. A support for attaching an accessory to a musical instrument, the instrument having a side and at least one lug, the support comprising:
   a base,
   a connector attached to the base and being adapted to engage the lug and hold the base on the, wherein the connector includes a lever to hold the base on the instrument; and
   an accessory holder mounted on the base.

13. A support as defined in claim 12, wherein the base has first and second legs extending from opposite ends of the base, the first and second legs being adapted to contact the side of the musical instrument.

14. A support as defined in claim 12, wherein the base has a first surface and when the lever is rotated in a first direction the connector is moved closer toward the first surface of the base and when the lever is rotated in a second direction the connector is moved further away from the first surface of the base.

15. A support as defined in claim 12, wherein the lever may be locked into position so as to keep the connector engaged with the lug.

16. A support for attaching an accessory to a musical instrument, the instrument having a side and at least one lug, the support comprising:
   a base having first and second surfaces; the base defining a first aperture extending from the first surface to the second surface;
   an accessory holder mounted on the base; and
   a connector associated with the base and adapted to engage the lug to hold the base on the instrument, said connector including:
      a rod receivable through the first aperture;
      a lug engaging mechanism disposed at one end of the rod for engaging the lug; and
      a locking mechanism disposed at the other end of the rod, said locking mechanism being adapted to lock the lug engaging mechanism in position once it has engaged the lug.

17. A support as defined in claim 16, wherein the lug engaging mechanism is a hook.

18. A support as defined in claim 16, wherein the base defines a second aperture and the accessory holder comprises a shaft at least partially mounted within the second aperture in the base, the shaft including a mechanism for securing an accessory thereto.

19. A support as defined in claim 18, further comprising a shock absorber disposed between the shaft and the base.

20. A support as defined in claim 19, wherein the shaft and shock absorber are held by friction within the second aperture.

21. A support as defined in claim 16, wherein the locking mechanism comprises a lever, and when the lever is rotated in a first direction the lug engaging mechanism is moved closer toward the first surface of the base, and when the lever is rotated in a second opposite direction the lug engaging mechanism is moved further away from the first surface of the base.

22. A support as defined in claim 16, wherein the locking mechanism may be locked so as to keep the lug engaging mechanism engaged with the lug.

23. A support for attaching an accessory to a drum, the drum having a side and at least one lug, the support comprising:
   a) a base having
      a first surface;
      a second surface, the base defining an aperture and defining a bore extending from the first surface through to the second surface, the aperture and the bore being a spaced distance from each other; and the second surface further having a channel defined therein;
      first and second legs extending from opposite ends of the first surface, the first and second legs being adapted to engage the side of the drum;
   b) a lug engaging mechanism having:
      a rod which is at least partially received in one of the aperture and the bore;
      a hook disposed at one end of the rod so that the hook lies between the first and second legs of the base;
      a locking mechanism disposed at the opposite end of the rod; the locking mechanism including a layer which is at least partially received within the channel in the second surface of the base, the lever being rotatable between locked and unlocked positions, the locked position drawing the hook closer to the first surface of the base and the unlocked position moving the hook further away from the first surface of the base;
   c) an accessory holder mounted on the base, the accessory having:
      a shaft which is at least partially received within one of the aperture and the bore of the base, the shaft having a mechanism for securing an accessory thereto; and
      a shock absorber disposed between the shaft and the base, the shaft and the shock absorber being held by friction within the bore.

24. A support for attaching an accessory to an instrument; the instrument having a surface and a lug; the support comprising:
   a base adapted to engage the surface of the instrument;
   an accessory holder attached to the base; and
   attachment means mounted on the base and adapted to engage the lug of the instrument and hold the base on the instrument.

25. The support of claim 24, wherein the attachment means includes a device that forces the base against the surface of the instrument.

26. The support of claim 24, wherein the attachment means includes means for creating a tensile force in the attachment means.

* * * * *